United States Patent [19]

Sterr

[11] 4,242,427
[45] Dec. 30, 1980

[54] METHOD FOR IMPROVING WETTABILITY OF HIGH TEMPERATURE CELL SEPARATORS

[75] Inventor: Gerhard Sterr, Kelkheim, Fed. Rep. of Germany

[73] Assignee: Varta Batterie, Aktiengesellschaft, Hanover, Fed. Rep. of Germany

[21] Appl. No.: 92,219

[22] Filed: Nov. 7, 1979

[30] Foreign Application Priority Data

Nov. 25, 1978 [DE] Fed. Rep. of Germany ....... 2851085

[51] Int. Cl.$^3$ ............................................. H01M 2/16
[52] U.S. Cl. ................................... 429/247; 429/112; 429/250; 427/126.1; 427/226; 29/623.1
[58] Field of Search ................................ 429/247–249, 429/250–255, 112; 427/190, 193, 126; 29/623.1

[56] References Cited

U.S. PATENT DOCUMENTS

| 3,510,359 | 5/1970 | Selover, Jr. et al. ............ 429/112 X |
| 4,189,827 | 2/1980 | Eberhart ......................... 429/112 X |

*Primary Examiner*—Charles F. LeFevour
*Attorney, Agent, or Firm*—Weiser, Stapler & Spivak

[57] ABSTRACT

Separators for electrochemical high temperature cells with molten electrolytes, particularly consisting of the raw materials boron nitride or aluminum nitride, become better wettable through treatment with boron trifluoride. Preferably the separator, e.g. a BN fabric, may be sprinkled with a $BF_3$ yielding material, e.g. $KBF_4$ and activated through brief heating to about 400° C.

6 Claims, No Drawings

METHOD FOR IMPROVING WETTABILITY OF HIGH TEMPERATURE CELL SEPARATORS

The invention relates to a method of improving the wettability of separators for electrochemical high temperature cells, in which the separator consists of a temperature-stable material.

An example of high temperature systems of the type under consideration consists of the cell Li-Al/LiCl-KCl/FeS$_x$ (where x=1 or 2). The electrolytes of such cells are molten liquid salt mixtures of mainly eutectic composition. Frequently an LiCl-KCl mixture is used, because it is characterized by good ion permeability and is also inexpensive. The negative electrode consists of a light metal of the group Li, Na, Ca, Be, Mg and Al and is preferably an Li electrode and is strengthened through alloy formation with Al.

The separator has the task of preventing any electron conduction between the electrodes while simultaneously providing the opportunity for ion flow through the electrolyte which is as unimpeded as possible. Simultaneously, there is to be prevented an out-migration of active material from the electrodes, e.g. of Li-Al and FeS$_x$ in the above described cell, because both of these substances are present in the form of powder and penetration of the separator by these fine particles leads to short-circuits and loss of capacity.

Unusual requirements are imposed upon the thermal resistivity of the separator when one takes into account that the operating temperature of an Li-Al/FeS$_x$ cell is about 450° C. At such temperatures there are superimposed upon the volume changes of the electrodes caused by the reaction, also thermal expansions, so that there is demanded from the separator a mechanical stability and erosion resistance which is generally found only in ceramic materials.

From U.S. Pat. No. 3,510,359 there is known a separator which consists of temperature resistant materials such as beryllium oxide (BeO), thorium oxide (ThO$_2$) magnesium oxide (MgO), lithium aluminate (LiAlO$_2$), boron nitride (BN), silicon nitride (Si$_3$N$_4$), aluminum nitride (AlN) or mixtures of these. Because these ceramic substances are not themselves ion conductors, the separator made of them must have an "open" structure, in order to insure adequate ion permeability. Therefore, the separator has been made in the form of an open frame which is flanked by the two electrodes, or one has kept the electrodes spaced by means of pins. Also, grids of rods, or even fabrics of ceramic have been used as separators. The latter may be made of boron nitride (BN) for example. They come closest to withstanding the considerable deformation forces which stem from volume and structure changes of the electrodes in the operating cell and are therefore preferably used.

However, when fabrics are used, there is encountered, in addition to expensive manufacture, poor wettability of the raw materials by the molten electrolyte. This necessarily also impairs the ion permeability.

Accordingly, it is an object of the invention to impart better wettability to a temperature stable separator having the form of a fabric, felt, or batting.

This and other objects which will appear are achieved in accordance with the invention by exposing the surface of the separator at elevated temperatures to the action of boron trifluoride (BF$_3$) or a substance which yields BF$_3$.

The method embodying the invention has been used with particular success in relation to the raw material boron nitride (BN), but also in relation to the chemically related aluminum nitride. In any case, the ceramic fiber fabrics, felts or battings which are currently used as separators in high temperature cells are limited to these raw materials.

It has been found that the wetting characteristic of such a fabric which has been treated at elevated temperatures with potassium tetrafluoroborate (KBF$_4$) was decisively improved. In so doing, the boron trifluoride was recognized as being the really active agent.

At room temperature, gaseous BF$_3$ may be produced, among other methods, by heating of boron trioxide and fluorospar (calcium fluoride) with concentrated sulfuric acid. AgF acts upon the boron halogen BCl$_3$, BBr$_3$ and BI$_3$ to form BF$_3$, in the latter case even in the cold.

However, preferred starting materials for the production of BF$_3$ are reaction compounds between it and alkaline or alkaline earth fluorides, particularly such reaction compounds which decompose even at low temperatures partially into the starting fluoride and BF$_3$. Among these, KBF$_4$ has a preferred position because it is easily obtainable and also inexpensive. During heating to a glow at about 300° to 400° C., the white powder decomposes into BF$_3$ and KF.

In a concrete example, the practical performance of the method embodying the invention consists in that a BN fabric which may have dimensions of 10×10×0.5 cm, is sprinkled from both sides as uniformly as possible with 5 g of finely powdered KBF$_4$ and is subsequently heated for ten minutes to 400° C.

For thicker separators, such as battings, it may be desirable to soak these with an aqueous KBF$_4$ solution, to let the moisture evaporate, and then carry out the heating as above.

After cooling, the wettability of the separator is materially enhanced.

As the reason for this behavior, there can be seen the strong tendency of the boron trifluoride to complete its 6-electron shell to 8 electrons. This is made possible because the BF$_3$ molecule with its electron vacancy unites with another molecule having a free electron pair or full electron shell. In accordance with Lewis' theory there thus arises an additive compound of the acid-like material BF$_3$ (electron acceptor) and a base-like material (electron donor) whose function in this case is performed by the boron nitride or aluminum nitride. Despite different orbital structures, the electrons around the boron nitrogen pair and around the aluminum nitrogen pair (3+5) always complete themselves to 8, so that in both cases there are the preconditions for an octet configuration. Stronger electron-anisotropy in the surface region of the BN separator (BN crystallizes in graphite-like manner, AlN in accordance with the "Zinkite" (ZnO)-type) in the sense of an electron density increase, may also contribute to the fact that the wettability effect due to the BF$_3$ influence is particularly pronounced for boron nitride.

I claim:

1. Method for improving the wettability of separators in electrochemical high temperature cells with molten electrolyte in which the separator consists of a temperature stable raw material, wherein
    the surface of the separator is exposed at elevated temperature to the influence of boron trifluoride (BF$_3$) or a substance which yields BF$_3$.

2. The method of claim 1 wherein the separator raw material is boron nitride (BN) or aluminum nitride (AlN).

3. The method of claim 1 wherein the separator is sprinkled on all sides with the $BF_3$ yielding substance in powdered form and is heated to about 300° to 400° C. for several minutes.

4. The method of claim 1 wherein the $BF_3$ yielding substance is a reaction compound of an alkaline or alkaline earth fluoride with $BF_3$.

5. The method of claim 4 wherein the reaction compound is potassium tetrafluoroborate ($KBF_4$).

6. The separator made by the method of claim 1.

* * * * *